US010897493B2

(12) United States Patent
Yang et al.

(10) Patent No.: US 10,897,493 B2
(45) Date of Patent: Jan. 19, 2021

(54) SYSTEMS AND METHODS FOR PREDICTIVE USER LOCATION AND CONTENT REPLICATION

(71) Applicant: Verizon Patent and Licensing Inc., Arlington, VA (US)

(72) Inventors: Jin Yang, Orinda, CA (US); Sagiv Draznin, Walnut Creek, CA (US); Matthew W. Nelson, Pleasanton, CA (US); Shahryar Ghandeharizadeh, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 90 days.

(21) Appl. No.: 16/273,017

(22) Filed: Feb. 11, 2019

(65) Prior Publication Data

US 2020/0259878 A1 Aug. 13, 2020

(51) Int. Cl.
*H04L 29/06* (2006.01)
*H04L 29/08* (2006.01)
*H04W 4/029* (2018.01)
*H04W 88/18* (2009.01)
*H04W 24/08* (2009.01)
*H04W 4/02* (2018.01)
*H04W 64/00* (2009.01)

(52) U.S. Cl.
CPC ........ *H04L 65/605* (2013.01); *H04L 67/2847* (2013.01); *H04W 4/027* (2013.01); *H04W 4/029* (2018.02); *H04W 24/08* (2013.01); *H04W 64/00* (2013.01); *H04W 88/184* (2013.01)

(58) Field of Classification Search
CPC .. H04L 65/605; H04L 67/2847; H04W 4/209; H04W 4/027; H04W 24/08; H04W 64/00; H04W 88/184
See application file for complete search history.

(56) References Cited

U.S. PATENT DOCUMENTS 10,037,231 B1 * 7/2018 Jakhetiya .............. G06F 9/5072
10,251,018 B1 * 4/2019 Susel ................... H04W 64/003
(Continued)

OTHER PUBLICATIONS

Mahmood et al., "The RICH Prefetching in Edge Caches for In-Order Delivery to Connected Cars", Nov. 6, 2018, IEEE Transactions on Vehicular Technology, IEEE Publishing.*

(Continued)

*Primary Examiner* — Todd L Barker

(57) ABSTRACT

A Multi-access Edge Computing ("MEC") controller may predict locations for a tracked UE at different future times, and may also predict content that the tracked UE may request at the different future times. The predictions may be based on MEC controller computing probabilities for the tracked UE being at the different locations at the different future times, and/or probabilities for the content that the tracked UE is likely to request at the different locations and/or future times. The MEC controller may identify a MEC device that provides extremely low latency service and/or optimally serves a network area that includes a predicted location. The MEC controller may issue a prefetch message to the MEC device that causes the MEC device to prefetch predicted content that the tracked UE is likely to request at the future time the tracked UE is likely to reach the predicted location.

20 Claims, 9 Drawing Sheets

(56) References Cited

U.S. PATENT DOCUMENTS

| | | | |
|---|---|---|---|
| 10,623,782 B1* | 4/2020 | Hong | G06N 5/046 |
| 2012/0115505 A1* | 5/2012 | Miyake | H04W 4/027 |
| | | | 455/456.1 |
| 2012/0117240 A1* | 5/2012 | Omar | H04W 4/021 |
| | | | 709/226 |
| 2017/0295246 A1* | 10/2017 | Georgiou | H04L 67/148 |
| 2019/0138934 A1* | 5/2019 | Prakash | G06K 9/6257 |

OTHER PUBLICATIONS

Gomes et all, "Edge Caching with mobility prediction in virtualized LTE mobile networks", Jun. 2016, ELSEVIER publishing.*
Mahmood et al., "Mobility-Aware Edge Caching for Connected Cars", 2016 12th Annual Conference on Wireless On-demand Network Systems and Services (WONS).*

* cited by examiner

|  | +X | +2X | +3X | +4X | +5X |
|---|---|---|---|---|---|
| 120-6 | 0% | 0% | 0% | 5% | 20% |
| 120-5 | 0% | 0% | 10% | 40% | 30% |
| 120-4 | 15% | 30% | 75% | 45% | 30% |
| 120-3 | 70% | 50% | 15% | 10% | 20% |
| 120-2 | 15% | 20% | 0% | 0% | 0% |
| 120-1 | 0% | 0% | 0% | 0% | 0% |

SYSTEMS AND METHODS FOR PREDICTIVE USER LOCATION AND CONTENT REPLICATION

BACKGROUND

Network hosts may provide content, services, processing, and/or data to user equipment ("UE") that operate from different network edges and/or network points of access. Some network hosts may be unable to provide latency-sensitive content, services, processing, and/or data (e.g., media streaming, real-time data, autonomous driving, etc.) within desired latency envelopes to UEs at certain network edges and/or network points of access. Consequently, the presentation, playback, and/or other use of the latency-sensitive content, services, processing, and/or data may be adversely affected.

BRIEF DESCRIPTION OF THE DRAWINGS

FIG. 6 conceptually illustrates a location vector predictor in accordance with some embodiments described herein.

DETAILED DESCRIPTION OF PREFERRED EMBODIMENTS

Figure 1A:
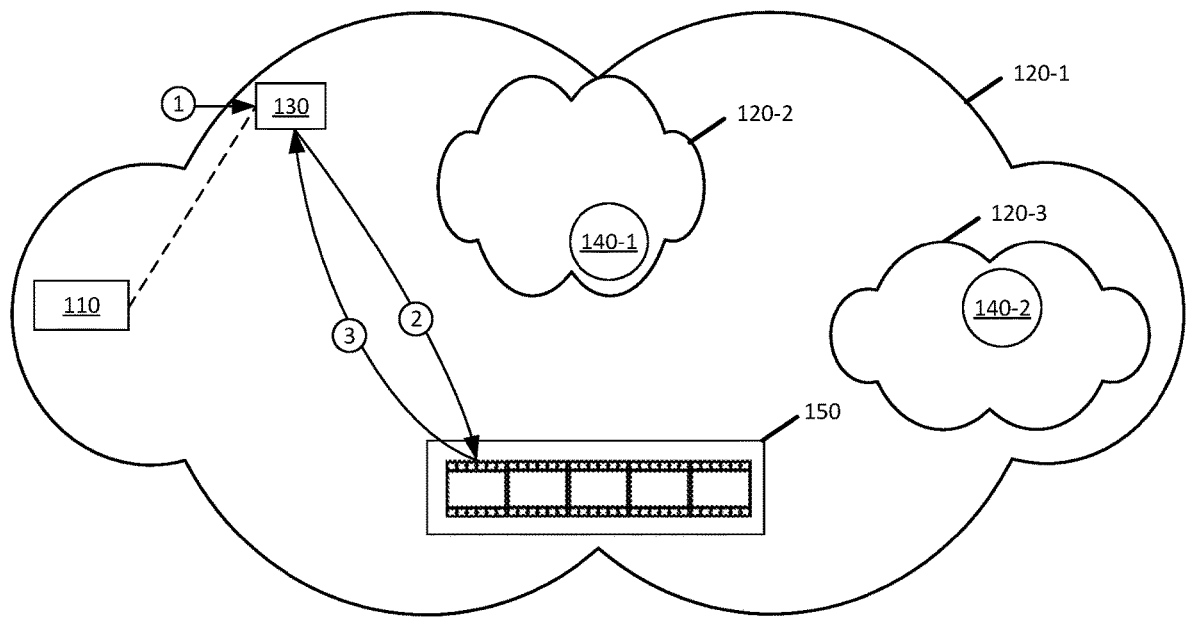
FIGS. 1A-1D illustrate an example of predictive content replication in accordance with some embodiments described herein.

The following detailed description refers to the accompanying drawings. The same reference numbers in different drawings may identify the same or similar elements.

Systems and/or methods, as described herein, provide a Multi-access Edge Computing ("MEC") controller for predictive content replication across different MEC devices that are located closer to different network edges or network points of access than network hosts that host the replicated content. The MEC controller may predict future locations of different user equipment ("UE"), and/or the content that the UEs may request when operating from the predicted locations. The MEC controller may then coordinate the replication of content across a set of MEC devices that are selected based on the predictions. Each MEC device from the set of MEC devices may prefetch the content that is predicted to be relevant for the locations that are served by that MEC device. The set of MEC devices may then directly serve the predicted content from cache with extremely low latency to the UEs upon the UEs arriving at the predicted locations and requesting the predicted content.

FIGS. 1A-1D illustrate an example of predictive content replication in accordance with some embodiments described herein. FIGS. 1A-1D may include MEC controller 110, first network area 120-1, second network area 120-2, third network area 120-3, UE 130, first MEC device 140-1, second MEC device 140-2, and content source 150.

In some embodiments, first network area 120-1, second network area 120-2, and third network area 120-3 (herein sometimes collectively referred to as "network areas 120" or individually as "network area 120") may represent different sets of paths, hops, service regions, network edges, network points of access, and/or data networks. In some embodiments, network areas 120 may represent different data networks and/or network access points (e.g., service regions) from which to access content, services, processing, and/or other data. For example, network areas 120 may represent different Wide Area Networks ("WANs"), Local Area Network ("LANs"), Personal Area Networks ("PANs"), Radio Access Networks ("RANs"), WiFi networks, or other networks.

MEC devices 140-1 and 140-2 (herein sometimes collectively referred to as "MEC devices 140" or individually as "MEC device 140") may include configurable computing, caching, and/or other resources that can provide content, services, processing, and/or data with extremely low latency (e.g., less than 10 milliseconds) to UEs that operate from different network areas 120. For instance, MEC device 140-1 may provide extremely low latency and/or lower latency content, services, processing, and/or data to UEs operating from network area 120-2 than MEC device 140-2, content source 150, and/or other network hosts. Similarly, MEC device 140-2 may provide extremely low latency and/or lower latency content, services, processing, and/or data to UEs operating from network area 120-3 than MEC device 140-1, content source 150, and/or other network hosts.

As shown in FIG. 1A, UE 130 may be moved (at 1) to a first location that is in first network area 120-1 and that is outside second network area 120-2. UE 130 may issue (at 2) a request for a particular media stream to content source 150, and content source 150 may provide (at 3) a first segment of the particular media stream to UE 130. The request may, in some embodiments, be (or include) a HyperText Transfer Protocol ("HTTP") GET message with a Uniform Resource Locator ("URL"). The URL may specify a domain name of content source 150 and/or the name of the particular media stream. In some embodiments, content source 150 may be a network accessible site or host that originates the particular media stream for distribution, and/or may be a network accessible site or host that distributes the particular media stream to requesting UEs.

Figure 1B:
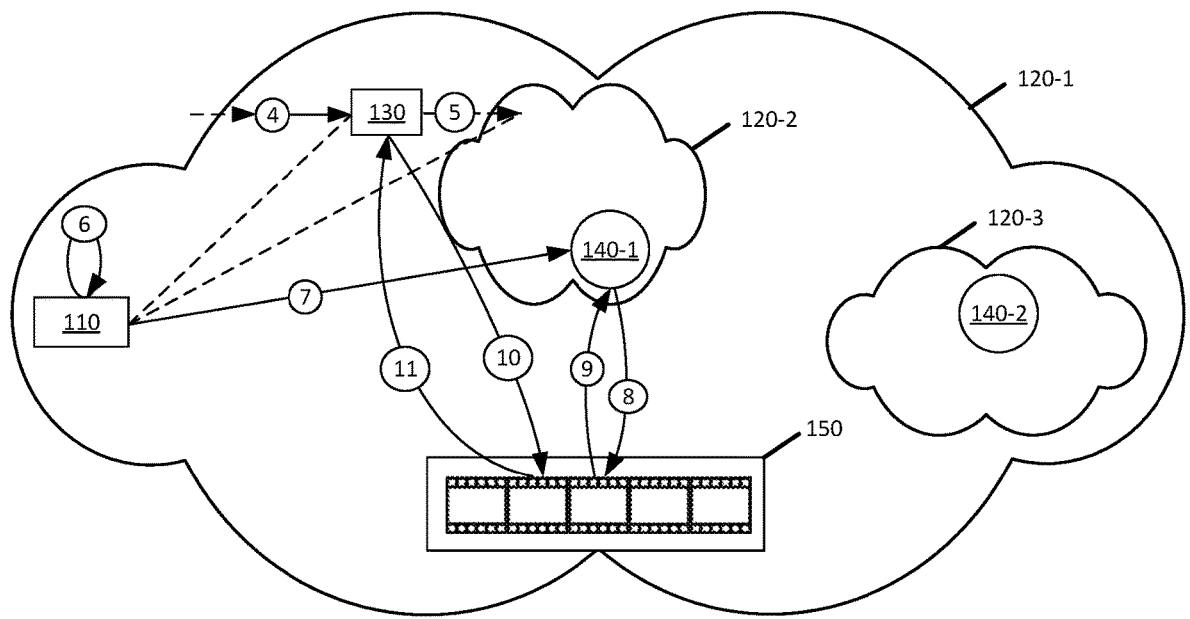

As shown in FIG. 1B, UE 130 may be moved (at 4) to a different second location that is in first network area 120-1 and that is in the direction of, but still outside of, second network area 120-2. In accordance with some embodiments, MEC controller 110 may track movements (at 1 and 4) of UE 130, and may determine or estimate (at 5), based on the tracked movements, that it is likely that UE 130 will be moved to a third location, within second network area 120-2 at a later time. MEC controller 110 may also determine or estimate (at 6) that it is likely that UE 130 will request the third segment of the particular media stream when UE 130 comes to the third location.

MEC controller 110 may initiate the predictive content replication based on these predictions. MEC controller 110 may be configured with a list of different MEC devices 140 that are distributed across the data network, and/or network areas 120 that are optimally served by each MEC device 140. In this figure, MEC device 140-1 may provide content, services, processing, and/or data to UEs that operate within second network area 120-2 with lower latency than other MEC devices (e.g., MEC device 140-2) or network hosts that host the same content, services, processing, and/or data. Accordingly, MEC controller 110 may issue (at 7) a prefetch message for the third segment to MEC device 140-1.

In response to the prefetch message, MEC device 140-1 may request (at 8) the third segment of the particular media stream from content source 150 before UE 130 requests the third segment or before UE 130 enters into, connects to, or accesses network services from second network area 120-2. Content source 150 may provide (at 9) the third segment to MEC device 140-1, and MEC device 140-1 may store the third segment to a local cache (e.g., memory device, or set of memory devices, that are installed at MEC device 140-1 and/or are more physically proximate to MEC device 140-1 than physical resources upon which content source 150 stores content).

While at the second location illustrated in FIG. 1B, UE 130 may request (at 10) the second segment of the particular media stream from content source 150. Content source 150 may provide (at 11) the second segment to UE 130.

Figure 1C:
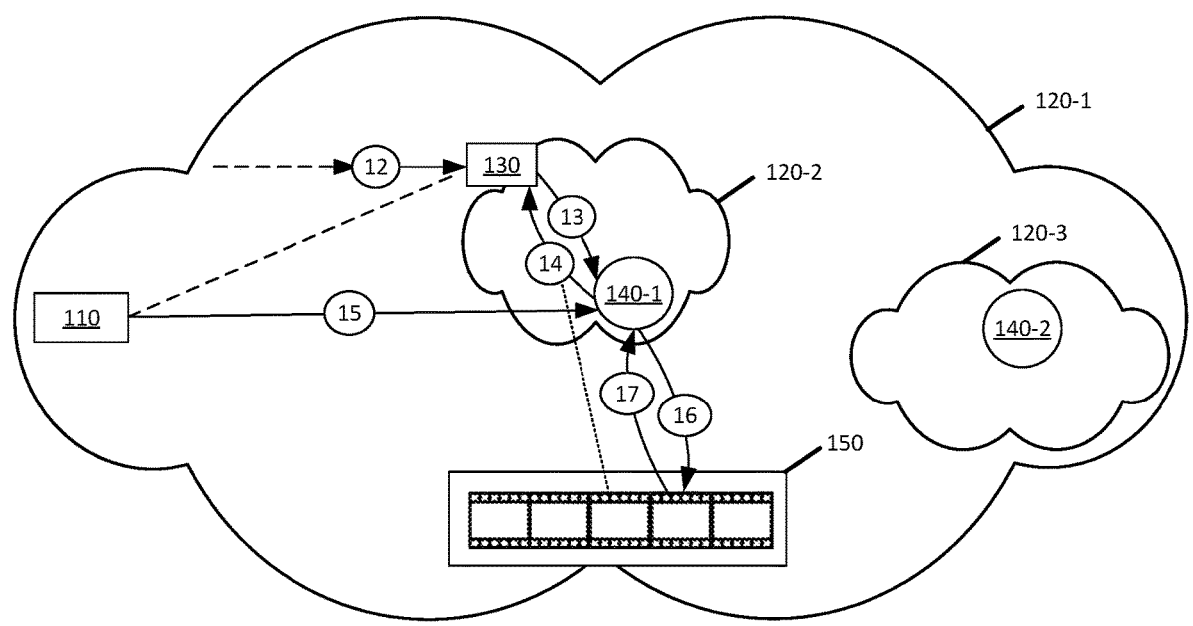

As shown in FIG. 1C, UE 130 may be moved (at 12) to a third location that is in second network area 120-2. In some embodiments, a handover may transition UE 130 from one RAN or network to another as a result of UE 130 being moved into second network area 120-2. For instance, the signal strength, performance, and/or other characteristics for a RAN or network represented by second network area 120-2 may be greater than another RAN or another network represented by first network area 120-1, and may therefore trigger the handover to occur. In some other embodiments, UE 130 may switch networks upon being moved into second network area 120-2 when second network area 120-2 represents a preferred or prioritized network. For instance, second network area 120-2 may correspond to a WiFi network coverage area, and first network area 120-1 may correspond to a coverage area of WAN.

UE 130 may issue (at 13) a request for the third segment of the particular media stream when at the third location. MEC device 140-1 may intercept, receive, or otherwise obtain the third segment request. In some embodiments, MEC device 140-1 may obtain the third segment request as a result of a network handover that occurred when UE 130 entered in second network area 120-2, and/or MEC device 140-1 being located in the network path that is used by UE 130 and/or other UEs for network access when in second network area 120-2. For instance, MEC device 140-1 may be located at a gateway between a first network represented by second network area 120-2 and an external data network.

As a result of the earlier performed (at 8 and 9) prefetch operation, MEC device 140-1 may have the third segment cached, and may therefore provide (at 14) the third segment to UE 130 directly from its local cache and with extremely low latency. Accordingly, when UE 130 hands-in from one network to another or otherwise switches network connectivity upon entering second network area 120-2, UE 130 may continue accessing the particular media stream without delay, buffering, and/or other degradation of the user experience. In fact, the user experience may improve as the latency for UE 130 requesting and receiving a segment of the particular media stream may be reduced because of MEC device 140-1 predictively prefetching and serving content to UE 130 from a location that is more proximate (e.g., fewer network hops) to UE 130 than content source 150.

MEC controller 110 may issue additional prefetch messages, and MEC device 140-1 may predictively prefetch additional segments of the particular media stream based on the predicted time that UE 130 is likely to remain in second network area 120-2. For instance, MEC controller 110 may determine from the tracked movement speed and/or path of UE 130, that UE 130 is likely to remain in second network area 120-2 long enough to request the third and fourth segments of the particular media stream. Accordingly, MEC controller 110 may issue (at 15) a prefetch message for the fourth segment to MEC device 140, and MEC device 140 may request (at 16) the fourth segment from content source 150.

In some embodiments, MEC controller 110 may issue (at 15) the prefetch message for the fourth segment, and MEC device 140-1 may issue (at 16) the request for the fourth segment before MEC device 140-1 receives the third segment request and/or a fourth segment request from UE 130 and/or other UEs. In some other embodiments, MEC device 140-1 may request (at 16) the fourth segment at the same time as requesting (at 8) the third segment from content source 150. In still some other embodiments, MEC device 140-1 may request (at 16) the fourth segment some time after requesting (at 8) the third segment, but before receiving a request for the fourth segment from UE 130 and/or other UEs. Content source 150 may provide (at 17) the fourth segment to MEC device 140-1, and MEC device 140-1 may store the fourth segment in its local cache.

In some embodiments, MEC controller 110 may direct MEC device 140-1 to prefetch additional segments (e.g., fifth and sixth segments of the particular media stream) as a buffer in the event that the speed and/or path of UE 130 changes, and UE 130 remains in second network area 120-2 for a longer than predicted amount of time. In some embodiments, MEC controller 110 may direct MEC device 140-1 to prefetch other content, services, processing, and/or data in response to predicting that UE 130 may request the other content, services, processing, and/or data, instead of or in addition to the particular media stream, while operating in second network area 120-2.

Figure 1D:
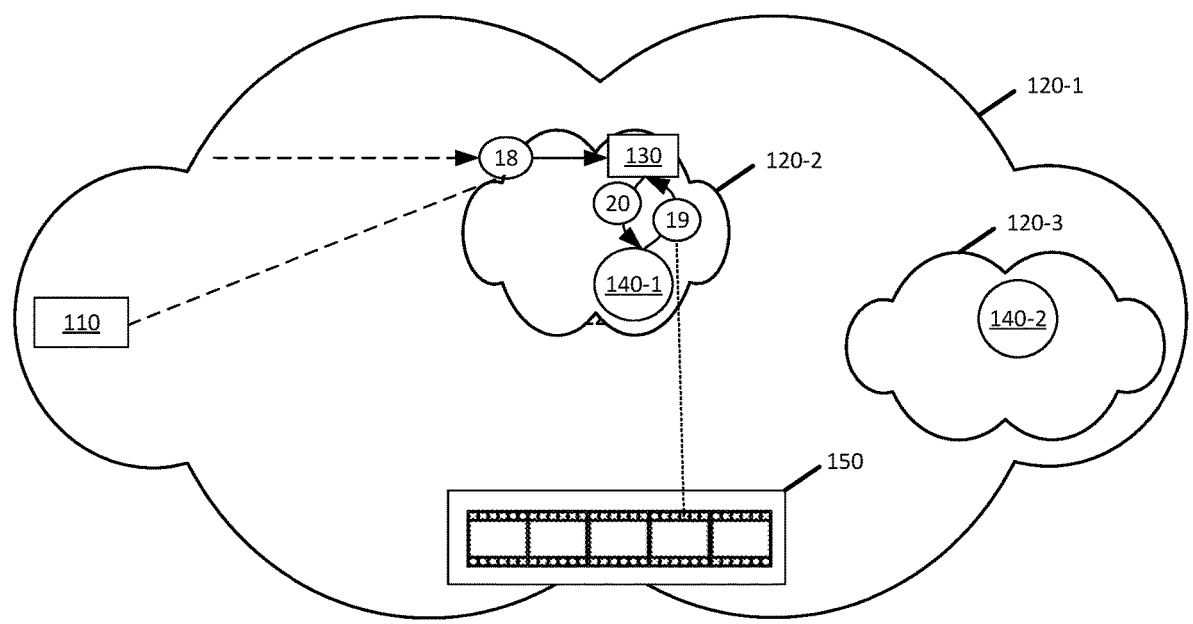

As shown in FIG. 1D, UE 130 may be moved (at 18) to a fourth location that is in second network area 120-2. UE 130 may request (at 19) the fourth segment. MEC device 140-1 may intercept, receive, or otherwise receive the fourth segment request. MEC device 140-1 may provide (at 20) the fourth segment from its local cache to UE 130 in response to the fourth segment request without the delay associated with retrieving and/or distributing the fourth segment from the more distant content source 150.

FIGS. 1A-1D illustrate predictive content replication for streaming content. However, the predictive content replication may be performed for other types of content, service, and/or data.

In some embodiments, the predictive content replication may be used to prefetch latency sensitive content, services, processing, and/or data. For instance, UE 130 may run a real-time service (e.g., autonomous driving, navigation, remote robotic operation, etc.) that requires low latency data and responsiveness even when UE 130 is handed off between different networks or retrieves data over different network paths when in transit. UE 130 requests for content, services, processing, and/or data that are not latency sensitive or that were not predictively prefetched may proxy through MEC device 140-1 to the intended content source 150, and content source 150 may respond to the request with the same latency as UE 130 would experience without the predictive content replication.

In some embodiments, the predictive content replication may be used to prefetch content, services, processing, and/or data that are popular, temporally relevant, geographically relevant, contextually relevant, and/or otherwise predicted to have relevance for UE 130 based on a predicted destination or travel route. For instance, the predictive content replication may include prefetching content that UE 130 has regularly accessed in the past, that UE 130 and/or other UEs have regularly accessed while at the same location or on the same predicted travel route, that UE 130 has accessed when at certain locations, that relate to current and/or active data sessions of UE 130 and/or similarly positioned UEs, that relate to popular content, etc.

Figure 2A:
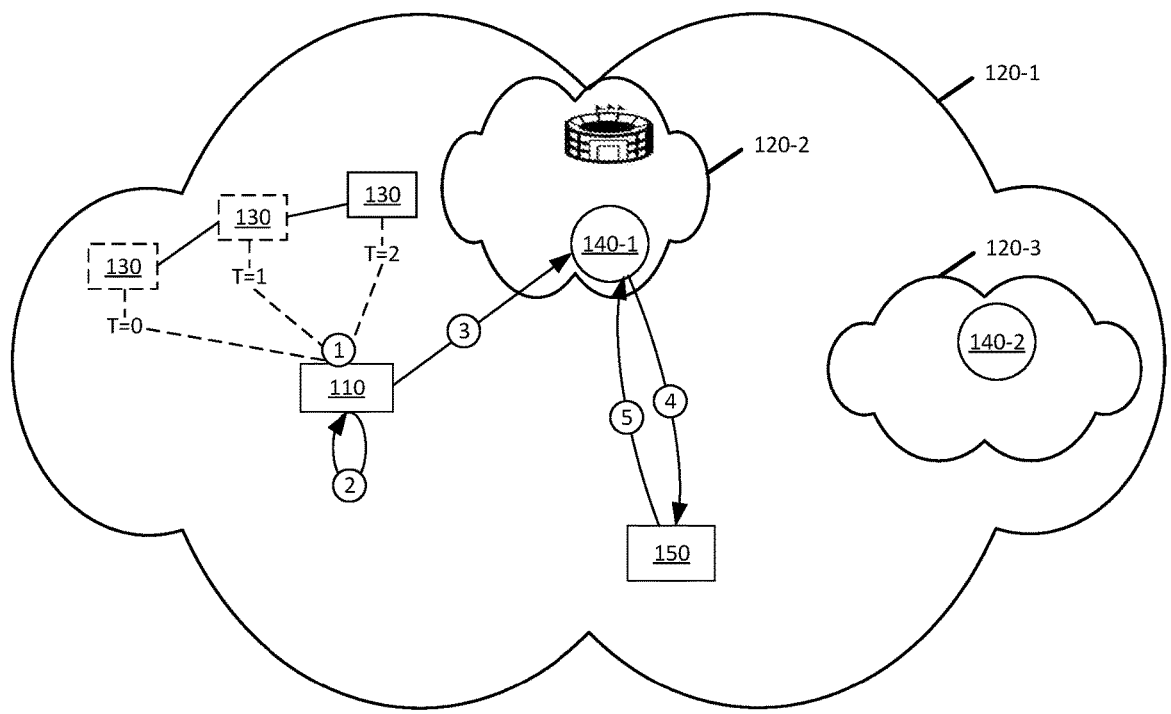
FIGS. 2A and 2B illustrate an example of predictive replication of geographically relevant content in accordance with some embodiments described herein.
Figure 2B:
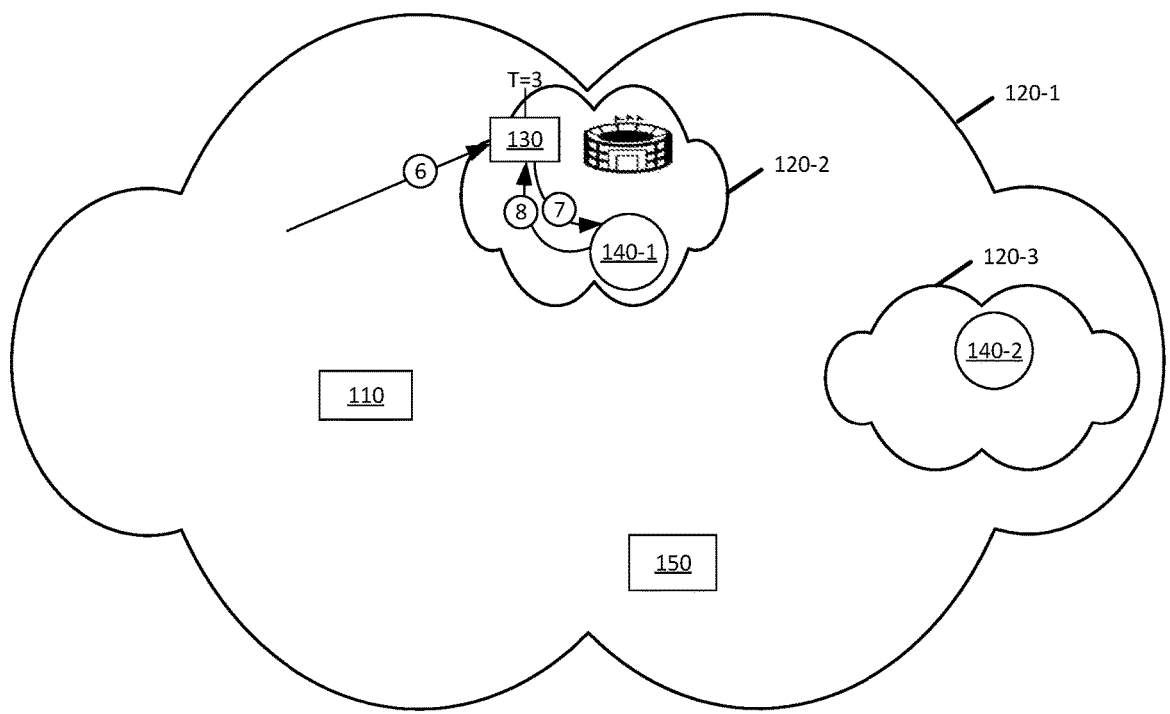

FIGS. 2A and 2B illustrate an example of predictive replication of geographically relevant content in accordance with some embodiments described herein. As shown in FIG. 2A, UE 130 may be moved towards a particular destination (e.g., a stadium) where an event may be taking place or may take place in the future. The particular destination may be located in second network area 120-2 (e.g., the coverage area of a particular RAN of a telecommunications network, a specific WiFi network, and/or other localized network).

MEC controller 110 may track (at 1) locations and/or movements of UE 130. MEC controller may determine (at 2), based on the tracked movements, that UE 130 is headed towards the particular destination for the event, and that UE 130 may be likely to request event-relevant data while en route or once at the particular destination. Accordingly, MEC controller 110 may replicate the event-relevant data in the cache of MEC device 140-1. MEC controller 110 may issue (at 3) a prefetch message to MEC device 140-1 with URLs and/or other identifiers for requesting the event-relevant data that MEC controller 110 predicts UE 130 is likely to access upon reaching second network area 120-2.

In response to receiving (at 3) the prefetch message, MEC device 140-1 may request (at 4) the event-relevant data from content source 150. Content source 150 may provide (at 5) the event-relevant data to MEC device 140-1, and MEC device 140-1 may store the event-relevant data in a local cache prior to UE 130 and/or other UEs requesting the event-relevant data.

As shown in FIG. 2B, UE 130 may be moved (at 6) to a different second location that is in second network area 120-2. As a result of moving into second network area 120-2, UE 130 may be handed off from one RAN or network to another RAN or another network. UE 130 may issue (at 7) a request for the event-relevant data. MEC device 140-1 may intercept, receive, and/or obtain the request, and may serve (at 8) the requested event-relevant data from the local cache to UE 130 with less latency than if content source 150 or MEC device 140-2 received and responded to the request.

In the event that UE 130 issues a request for content, services, processing, and/or data that is not prefetched by MEC device 140-1, MEC device 140-1 may proxy or forward the request to the intended recipient in the data network. In other words, MEC device 140-1 may treat the request as a cache miss, and allow the request to propagate to the intended recipient. The intended recipient may then respond to the request. MEC device 140-1 may also selectively intercept UE 130 requests in order to intercept requests for latency sensitive content while other requests pass to their intended destination.

In some embodiments, MEC controller 110 may replicate content at two or more MEC devices 140 based on sufficiently high probabilities of UE 130 entering different network areas served by those MEC devices 140 and/or requesting the replicated content from the different network areas. For instance, MEC controller 110 may predict a first probability of UE 130 entering a first RAN at a particular time, and may predict a second probability of UE 130 entering an adjacent second RAN at the particular time. The first and second probabilities may each satisfy a condition (e.g., a location prediction threshold, a threshold probability, exceed certain values, etc.) that triggers the predictive content replication at MEC devices 140 for the first and second RANs. MEC controller 110 may also predict a third probability of UE 130 requesting particular content from within the first RAN, and a fourth probability of UE 130 requesting the particular content from within the second RAN. Accordingly, MEC controller 110 may direct MEC devices 140 for the first and second RANs to prefetch the same particular content based on the third and fourth probabilities (e.g., the third and fourth probabilities satisfying a content prediction threshold).

Figure 3A:
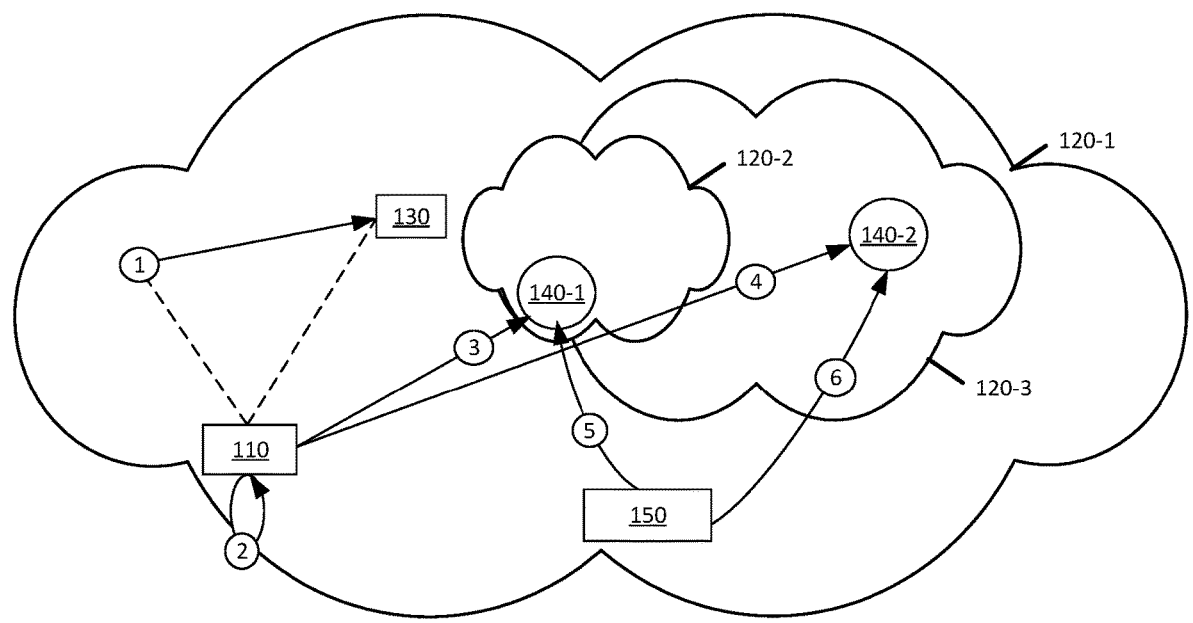
FIGS. 3A-3C illustrate an example of predictive content replication at Multi-access Edge Computing ("MEC") devices serving overlapping network areas in accordance with some embodiments described herein.
Figure 3B:
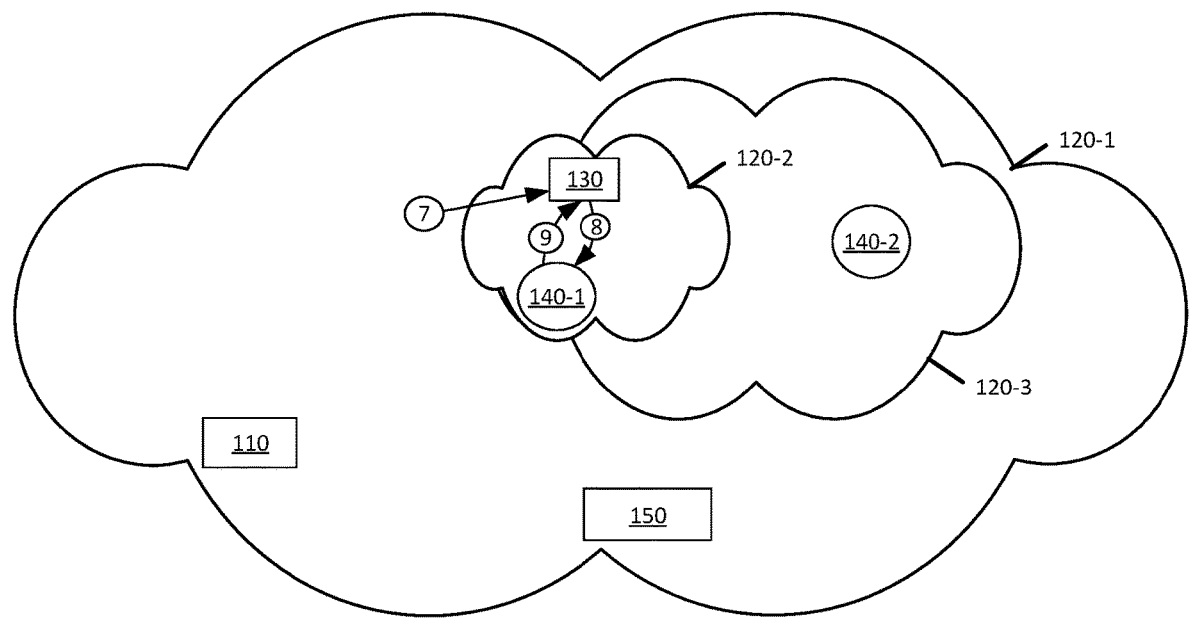
Figure 3C:
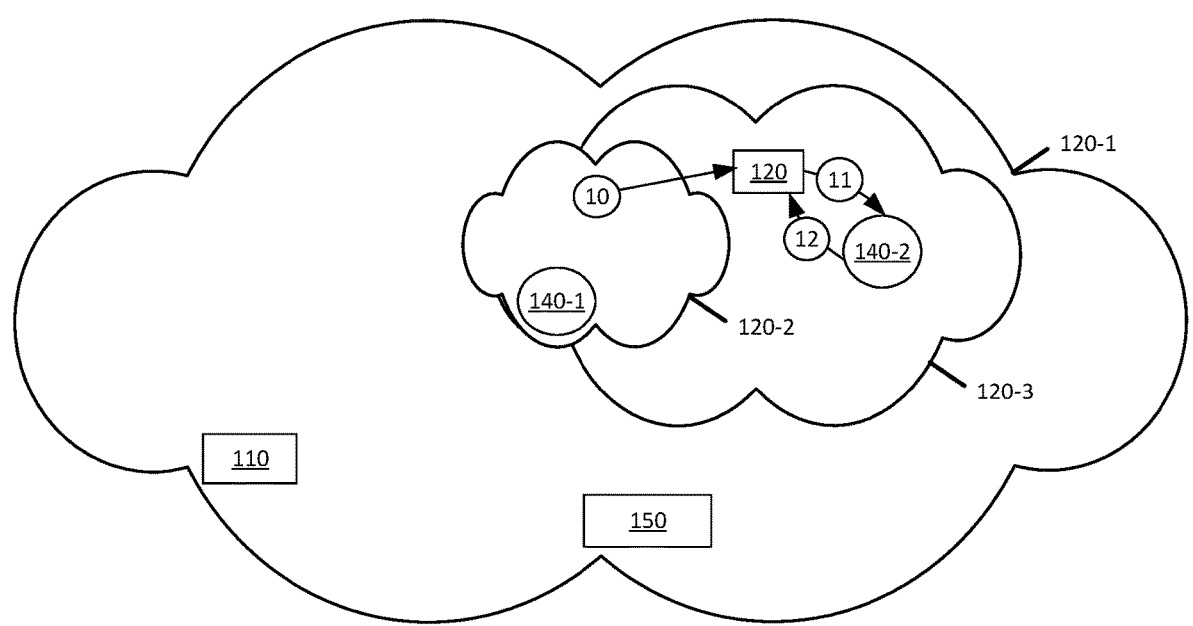

In some embodiments, MEC controller 110 may replicate content at MEC devices 140 that serve overlapping network areas. FIGS. 3A, 3B, and 3C illustrate an example of predictive content replication at MEC devices 140-1 and 140-2 serving overlapping network areas in accordance with some embodiments described herein.

FIG. 3A illustrates an environment with first network area 120-1, second network area 120-2, and third network area 120-3. Second network area 120-2 and third network area 120-3 may partially overlap. In the overlapping area, UE 130 may obtain network access from different networks or service regions. For example, second network area 120-2 may represent a Fifth Generation New Radio ("5G NR") region of a telecommunications network, and third network area 120-3 may represent a Fourth Generation Long Term Evolution ("4G LTE") region of the telecommunications network having a larger coverage area than the 5G NR region. As another example, second network area 120-2 may represent a WiFi network, and third network area 120-3 may represent a RAN of a telecommunications network.

MEC device 140-1 may provide localized or extremely low latency delivery of content, services, processing, and/or data to UEs that obtain network access via second network area 120-2. MEC device 140-2 may provide localized or extremely low latency delivery of content, services, processing, and/or data to UEs that obtain network access via third network area 120-3. Even though second network area 120-2 and third network area 120-3 overlap in part, UEs that operate in the overlapping region and that obtain network access via second network area 120-2 may experience better performance (e.g., lower latency of network communication) than UEs that operate in the overlapping region and that obtain network access via third network area 120-3. The performance difference may be due to MEC device 140-2 having to serve a greater network area than MEC device 140-1, and/or MEC device 140-2 being located further away from UEs than MEC device 140-1. MEC controller 110 may account for the performance differences when selecting where to replicate content.

In FIG. 3A, UE 130 may be moved (at 1) towards second network area 120-2 and third network area 120-3. MEC controller 110 may monitor the movements. Based on the monitored movements of UE 130, MEC controller 110 may determine (at 2) that UE 130 is likely to first obtain network access using second network area 120-2 before obtaining network access via third network area 120-3. MEC controller 110 may also determine (at 2) content that UE 130 may request when obtaining network access via the different network areas 120.

MEC controller 110 may monitor and/or obtain performance characteristics (e.g., average latency, bandwidth, etc.) of network areas 120. Based on the performance characteristics, MEC controller 110 may determine that MEC device 140-1 provides better content delivery performance than MEC device 140-2 to UEs operating in the overlapping region of second network area 120-2 and third network area 120-3. MEC controller 110 may further determine that MEC device 140-2 provides better content delivery performance to UEs operating in non-overlapping regions of third network area 120-3. Accordingly, MEC controller may provide (at 3) a first prefetch message to MEC device 140-1, and may provide (at 4) a second prefetch message to MEC device 140-2.

The first prefetch message (at 3) may include URLs and/or identifiers for a first set of content that MEC controller 110 predicts UE 130 is likely to request during a first amount of time when UE 130 is in the overlapping region of second network area 120-2 and third network area 120-3. In response to the first prefetch message, MEC device 140-1 may prefetch (at 5) and locally cache the first set of content from content source 150.

The second prefetch message (at 4) may include URLs and/or identifiers for a second set of content that MEC controller 110 predicts UE 130 is likely to request during a second amount of time when UE 130 is in non-overlapping regions of third network area 120-3. In response to the second prefetch message, MEC device 140-2 may prefetch (at 6) and locally cache the second set of content from content source 150. In some embodiments, the second set of content cached by MEC device 140-2 may include all or a subset of the first set of content cached by MEC device 140-1. The second set of content may also include other content that is not part of the first set of content.

As shown in FIG. 3B, UE 130 may be moved (at 7) to a different second location. The second location may correspond to the overlapping region of second network area 120-2 and third network area 120-3. At the second location, UE 130 may obtain network access from a first network, that is accessible when operating in second network area 120-2, or a second network, that is accessible when operating in third network area 120-3. UE 130 may handover, switch, and/or connect to the first network based on performance reasons, a user selection, network prioritization, and/or other criteria. Consequently, MEC device 140-1 may now be in the network path that UE 130 uses for network access, and may monitor messages passing to and from UE 130. UE 130 may issue (at 8) a request for content from the first set of predicted content. MEC device 140-1 may intercept, receive, and/or otherwise obtain the request from UE 130. MEC device 140-1 may determine that the requested content is locally cached, and may serve (at 9) the content to UE 130.

As shown in FIG. 3C, UE 130 may be moved (at 8) to a third location that is outside second network area 120-2. Upon UE 130 leaving second network area 120-2, UE 130 may handoff from the first network, that is accessible when operating in second network area 120-2, to the second network, that is accessible when operating in third network area 120-3. MEC device 140-2. UE 130 may issue (at 11) a request for content from the second set of content. MEC device 140-2 may intercept, receive, and/or otherwise obtain the request from UE 130, and may determine that the requested content is locally cached. Consequently, MEC device 140-2 may serve (at 12) the content to UE 130.

FIGS. 3A-3C illustrate how the predictive content replication may be used to prefetch content to different MEC devices 140-1 and 140-2 to coincide with expected UE 130 locations and expected content that UE 130 requests at each location. Specifically, MEC controller 110 may direct MEC devices 140 in prefetching different content based on predictions where UE 130 is likely to be at different times in the future, and content that UE 130 is expected to access at those different times. MEC controller 110 may coordinate the predictive prefetching in order to minimize latency and localize the delivery of the content to UE 130 when UE 130 operates from different network areas 120.

Figure 4:
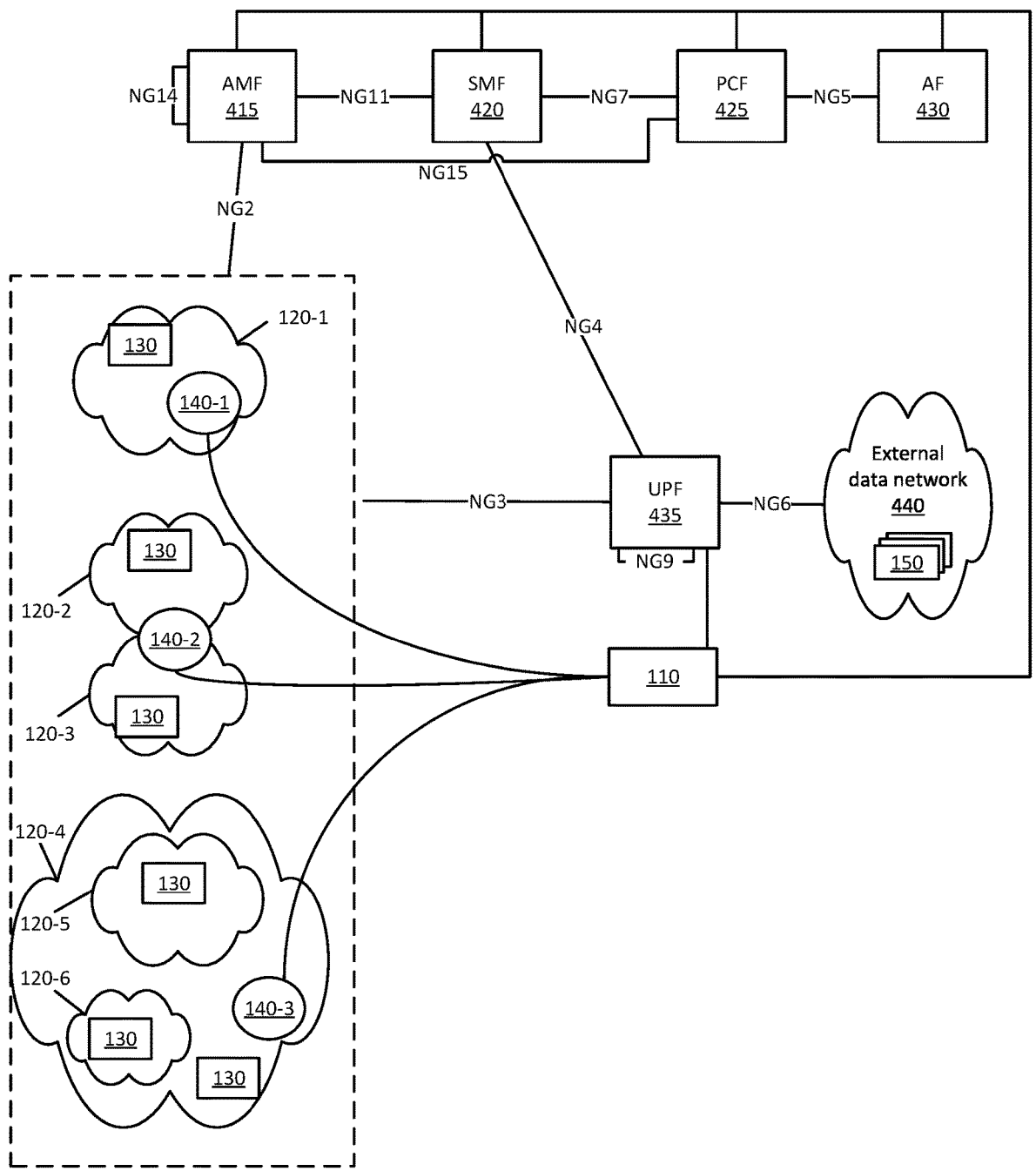
FIG. 4 illustrates an example environment, in which systems and/or methods described herein may be implemented according to some embodiments described herein.

FIG. 4 illustrates example environment 400, in which systems and/or methods described herein may be implemented. As shown in FIG. 4, environment 400 may include MEC controller 110, network areas 120-1, 120-2, 120-3, 120-4, 120-5, and 120-6, one or more UEs 130, MEC devices 140-1, 140-2, and 140-3, Access and Mobility Management Function ("AMF") 410, Session Management Function ("SMF") 420, Policy Control Function ("PCF") 425, Application Function ("AF") 430, User Plane Function ("UPF") 435, and external data network 440.

The quantity of devices and/or networks, illustrated in FIG. 4, is provided for explanatory purposes only. In practice, environment 400 may include additional devices and/or networks; fewer devices and/or networks; different devices and/or networks; or differently arranged devices and/or networks than illustrated in FIG. 4. For example, while not shown, environment 400 may include devices that facilitate or enable communication between various components shown in environment 400, such as routers, modems, gateways, switches, hubs, etc. Alternatively, or additionally, one or more of the devices of environment 400 may perform one or more functions described as being performed by another one or more of the devices of environments 400. For instance, MEC controller 110 may be implemented as part of AMF 410, SMF 420, UPF 435, etc. Devices of environment 400 may interconnect with each other and/or other devices via wired connections, wireless connections, or a combination of wired and wireless connections. In some implementations, one or more devices of environment 400 may be physically integrated in, and/or may be physically attached to, one or more other devices of environment 400.

Environment 400 may correspond to a 5G network, and/or may include elements of a 5G network. While discussed here in the context of a 5G network, in some embodiments, MEC controller 110 may additionally, or alternatively, be implemented and/or executed by devices of other networks including, for example, a 4G network, an LTE network, a Third Generation ("3G") network, a public land mobile network ("PLMN"), and/or another network.

MEC controller 110 may be implemented and/or executed by dedicated and/or shared devices that are located within environment 400. MEC controller 110 may be configured with addressing, locations, access credentials, and/or identifying information for MEC devices 140. MEC controller 110 may control the predictive replication of content, services, processing, and/or data to the caches of different MEC devices 140 based on predicted movements and future locations of UEs 130, content that UEs 130 are predicted to access when at the predicted future locations, and/or MEC devices 140 that provide lowest latency service to the predicted future locations. MEC controller 110 may access one or more of AMF 410, SMF 420, PCF 425, AF 430, UPF 435, and/or other devices in environment 400 for data that is used to predict future locations of UEs 130, and/or content that UEs 130 may request when at the future locations.

Network areas 120 may represent different regions from which UEs 130 may obtain network access. Network areas 120 may include different RANs, PANs, LANs, WANs, WiFi networks, and/or other networks or network points of access. For instance, network area 120-1 may be, or may include, a 5G RAN that includes one or more base stations, via which UEs 130, that operate from network area 120-1, may communicate with one or more other elements of environment 400. UEs 130 may communicate in network area 120-1 via an air interface. For instance, network area 120-1 may include a base station that may receive traffic (e.g., voice call traffic, data traffic, messaging traffic, signaling traffic, etc.) from UEs 130 via the air interface, and may communicate the traffic to UPF 435, and/or one or more other devices or networks. Similarly, network area 120-1, via the corresponding base station, may receive traffic intended for UE 130 (e.g., from UPF 435, and/or one or more other devices or networks) and may communicate the traffic to UE 130 via the air interface. Network areas 120 may provide the same or different connectivity, performance, coverage, and/or other characteristics.

MEC devices 140 may provide computing, caching, and/or other resources. Different MEC devices 140 may be deployed with geographic proximity to one or more network areas 120 so that MEC device 140 resources can be leveraged to provide extremely low latency content delivery, services, processing, and/or other functionalities to UEs 130 operating from the geographically proximate network areas 120. For instance, MEC device 140-1 may be located in or next to network area 120-1, and may provide extremely low latency content delivery, services, processing, and/or other functionalities to UEs 130 operating in network area 120-1. MEC device 140-2 may be located in a network path by which messaging from UEs 130 in network areas 120-2 and 120-3 pass into the network, and may provide extremely low latency content delivery, services, processing, and/or other functionalities to UEs 130 operating in network areas 120-2 and 120-3. Similarly, MEC device 140-3 may provide low latency services to UEs 130 operating in network areas 120-4, 120-5, and/or 120-6.

UEs 130 may include computation and communication devices, such as wireless mobile communication devices that may obtain network access and/or communicate from network areas 120. For instance, a UE 130 may be, or may include, a radiotelephone; a personal communications system ("PCS") terminal (e.g., a device that combines a cellular radiotelephone with data processing and data communications capabilities); a personal digital assistant ("PDA") (e.g., a device that may include a radiotelephone, a pager, Internet/intranet access, etc.); a smart phone; a laptop computer; a tablet computer; a camera; a personal gaming system; an Internet-of-Things ("IoT") device (e.g., a sensor, a smart home appliance, or the like); or another type of mobile computation and communication device. UEs 130 may send traffic to and/or receive traffic from different content sources 150 in external data network 440 via network connectivity that is provided when operating in one or more network areas 120.

AMF 415 may include one or more computation and communication devices that perform operations to register UEs 130 with the 5G network, to establish bearer channels associated with UEs 130, to hand off UEs 130 from one network area 120 to another network area 120 or from one network to another network, and/or to perform other operations. In some embodiments, environment 400 may include multiple AMFs 415, which communicate with each other via the NG14 interface (denoted in FIG. 4 by the line marked "NG14" originating and terminating at AMF 415).

SMF 420 may include one or more network devices that gather, process, store, and/or provide information in a manner described herein. SMF 420 may, for example, facilitate in the establishment of communication sessions on behalf of UE 130. In some embodiments, the establishment of communications sessions may be performed in accordance with one or more policies provided by PCF 425.

PCF 425 may include one or more devices that aggregate information to and from the network and/or other sources. PCF 425 may receive information regarding policies and/or subscriptions from one or more sources, such as subscriber databases and/or from one or more users (such as, for example, an administrator associated with PCF 425).

AF 430 may include one or more devices that receive, store, and/or provide information that may be used in determining parameters (e.g., quality of service parameters, charging parameters, or the like) for certain applications.

UPF 435 may include one or more devices that receive, store, and/or provide data (e.g., user plane data). For example, UPF 435 may receive user plane data (e.g., voice call traffic, data traffic, etc.), destined for UEs 130, from external data network 440, and may forward the user plane data toward UEs 130 (e.g., via network areas 120, SMF 420, and/or one or more other devices). In some embodiments, multiple UPFs 435 may be deployed (e.g., in different geographical locations), and the delivery of content to UEs 130 may be coordinated via the NG9 interface (e.g., as denoted in FIG. 4 by the line marked "NG9" originating and terminating at UPF 435). Similarly, UPF 435 may receive traffic from UEs 130 (e.g., via network areas 120, SMF 420, and/or one or more other devices), and may forward the traffic toward external data network 440. In some embodiments, UPF 435 may communicate (e.g., via the NG4 interface) with SMF 420, regarding user plane data processed by UPF 435. This information may aid SMF 420 in monitoring (e.g., tracking, counting, etc.) the traffic for particular subscribers.

In some embodiments, MEC controller 110 may access one or more of AMF 415, SMF 420, PCF 425, AF 430, UPF 435 for data relating to user profiles, locations and movements of UEs 130 (e.g., user mobility), UE request patterns, active UE data sessions, content popularity, content relevancy, and/or other data. MEC controller 110 may use the data from these and other components of environment 400 to determine future locations of UEs, and to determine the content that UEs 130 may request when at the future locations.

External data network 440 may represent a data network from which UEs 130 in network areas 120 access different sites and/or content. Accordingly, different content sources 150 may be located in external data network 440. External data network 440 may include one or more wired and/or wireless networks. For example, external data network 440 may include an IP-based packet data network, a WAN such as the Internet, a private enterprise network, and/or one or more other networks.

Figure 5:
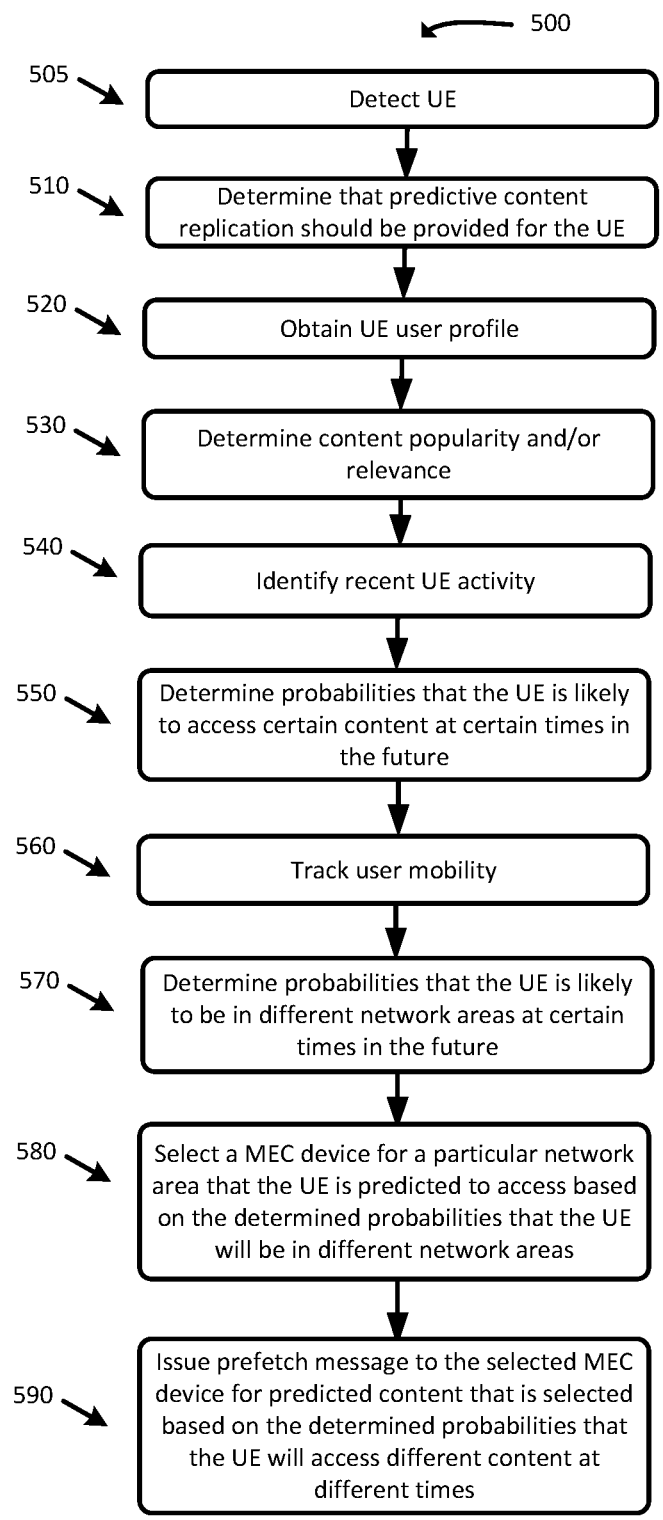
FIG. 5 presents a process for predicting content to replicate and selecting one or more MEC devices to receive the replicated content in accordance with some embodiments described herein.

FIG. 5 presents process 500 for predicting content to replicate and selecting one or more MEC devices to receive the replicated content in accordance with some embodiments described herein. Process 500 may be performed by MEC controller 110. In particular, MEC controller 110 may perform process 500 for each UE 130 whose location and/or movements can be tracked. MEC controller 110 may track movements of UE 130 when UE 130 obtains network access from one or more network areas 120, via location tracking services of UE 130 (e.g., Global Positioning System coordinates), and/or messaging from UE 130.

Process 500 may include detecting (at 505) a UE as a potential candidate to receive predictive content replication.

For instance, MEC controller 110 may detect (at 505) the UE upon the UE registering with the network and/or first obtaining network access.

In some embodiments, process 500 may be performed for subscribers or users that have opted to receive a higher quality of service via the predictive content replication (e.g., by subscribing to a service whereby the higher quality of service is provided than to subscribers or users who have not subscribed to the service). Accordingly, process 500 may also include determining (at 510) that the predictive content replication should be provided to UE based on subscriber information. MEC controller 110 may obtain the subscriber information from UDM, Home Subscriber Server ("HSS"), and/or another network component that stores subscriber information.

Process 500 may include acquiring data that MEC controller 110 can use to predict the content that the UE is likely to access at different points in the future. Accordingly, process 500 may include obtaining (at 520) a user profile for the UE. The user profile may identify various attributes of the UE and/or a user associated with the UE, such as demographic information, user and/or device behaviors, access patterns (e.g., content that is regularly accessed at a particular time, at a particular location, and/or after other content is accessed), access history (e.g., content, services, processing, and/or data that has been previously accessed by UE 130 at different times and/or locations), past locations and/or movements of the UE (e.g., a user's daily commute, user's work location, user's home location, etc.), and/or identifying user information. Generally, the user profile may identify content, services, processing, and data that the UE has accessed or is likely to access. Specifically, the user profile may identify particular content that the UE accesses at the same time of day or upon reaching a given location. MEC controller 110 may obtain the user profile from AMF 415, a Home Location Register ("HLR"), HSS, and/or another network component that stores the user profile.

Process 500 may include determining (at 530) content popularity and/or relevance. In some embodiments, content popularity may be based on aggregate requests received by the network for different content, services, processing, and/or data. For instance, popular content may be content that is frequently requested by a set of UEs, or that is requested a threshold number of times by a set of UEs. In some embodiments, content popularity may be based on requests made by the detected UE. In other words, popular content may be determined on a per-UE basis. Content relevance may include conditioning the popularity of content based on one or more of time, location, device, network performance, events, activity, and/or other factors. Accordingly, content may be popular at certain times, and unpopular at other times because of one or more relevance factors. In some embodiments, MEC controller 110 may use machine learning and/or artificial intelligence to determine (at 530) the content popularity and/or relevance. Requests made by the detected UE and/or requests by other UEs may be used to train various prediction models for the MEC controller 110 machine learning and/or artificial intelligence.

Process 500 may include identifying (at 540) recent activity of the UE. The recent activity may include sites, content, services, processing, and/or data that the UE is currently accessing and/or accessed within a previous time window (e.g., within the last minute, last 5 minutes, etc.). MEC controller 110 may obtain the recent activity from one or more of AMF 410, SMF 420, PCF 425, AF 430, UPF 435, and/or other network components.

Process 500 may include determining (at 550) content that the UE is likely to access in the future based on the user profile, content popularity and/or relevance, and active data sessions. MEC controller 540 may compute probabilities that the UE will access certain content, services, processing, and/or data at certain times in the future or when the UE is at certain locations, and may base the determination (at 550) on the computed probabilities satisfying a content prediction threshold. For instance, if the UE has streamed the first five minutes of a thirty-minute program, MEC controller 110 may predict with a high probability (e.g., 75%) that the UE is likely to continue requesting at least the next minute of the program. Similarly, if the UE regularly accesses particular content upon arriving at an office location, MEC controller 110 may predict with a high probability that the UE is likely to request that particular content in the future upon arriving at the office location. In some embodiments, process 500 may include aggregating additional data from which to predict access patterns of the UE. In some embodiments, the prediction may be limited to specific types of content. For instance, MEC controller 110 may predict the probability that the UE may access latency sensitive content that may be of interest to the user at different time in the future, but may not produce predictions for other content that may be of interest to the user but where the user experience is not affected or is minimally affected by higher latency. In some embodiments, the determination (at 550) of predicted content may also be temporally limited. For instance, MEC controller 110 may determine (at 550) content that the UE is expected to request up to one minute in the future. MEC controller 110 may use machine learning and/or artificial intelligence to generate the predictions. For instance, the machine learning may determine, that at the current location of the detected UE, other UEs at the current location and at the same time of day with users of a similar demographic are likely to access particular content.

Process 500 may also include acquiring data that MEC controller 110 can use to predict future locations of UE in different network areas. In particular, the MEC controller 110 may acquire data to predict the probability that the UE may be in different network areas at different times. Accordingly, process 500 may include tracking (at 560) user mobility. For instance, MEC controller 110 may track the speed, trajectory, distance, and/or other parameters related to the movements of the UE. MEC controller 110 may track the user mobility based on UE registrations with different RANs and/or networks, GPS, and/or other geolocation information that may be obtained directly from the UE or from other components of the network (e.g., AMF, a Mobile Management Entity ("MME"), etc.). MEC controller 110 may train machine learning and/or artificial intelligence models based on previous movements of the detected UE and/or other UEs at the same location to predict future movements and/or locations. For instance, the machine learning may determine that the current location of the detected UE may be along a path that other UEs have used with a high probability to reach a particular point of interest (e.g., airport, theme park, etc.).

Process 500 may include determining (at 570) future locations of the UE based on one or more of the user mobility tracking and/or the past movement tracking. In particular, MEC controller 110 may compute probability values for different times in the future that the UE is expected to operate from different network area. A higher probability value may be attributed to locations and times that are closer to the current location and current time, and a lower probability value may be attributed to locations and times that are further away from the current location and current time due to greater uncertainty as to whether the UE is likely to reach the further locations. In some embodiments, the determination (at 570) of predicted future locations may also be temporally limited. For instance, MEC controller 110 may determine (at 570) locations of the UE up to one minute in the future. The temporal limits on the location and content predictions may lessen the computational load on MEC controller 110, and/or may lessen the potential for polluting MEC device cache with too much content or irrelevant content that is not requested.

In some embodiments, MEC controller 110 may generate a location vector predictor for the UE based on the user mobility tracking and/or the past movement tracking of the UE. The location vector predictor may specify the probability of the UE being in specific network areas. FIG. 6 conceptually illustrates a location vector predictor in accordance with some embodiments described herein. The figure illustrates probabilities that predict UE 130 being in network areas 120-1, 120-2, 120-3, 120-4, 120-5, and 120-6 at different times in the future. A similarly content vector predictor may be generated by MEC controller 110. The content vector predictor may output probabilities of the UE requesting different content, services, processing, and/or data at different times in the future. Generating the location vector predictor and/or content vector predictor is an example of one technique for predicting or otherwise determining future locations of the UE and/or future content that the UE is likely to access at those future locations. Other techniques may be used to produce the predictions and/or probabilities. For instance, MEC controller 110 may generate a directed graph where each node has a discrete probability to a next node, and each node may represent a location and/or content.

Process 500 may then include selecting (at 580) an optimal MEC device for a particular network area that the UE is predicted to access based on determined probabilities that the UE will be in different network areas. In some embodiments, MEC controller 110 may select the optimal MEC device based on the highest probability of the UE operating from a particular network area, and the optimal MEC device providing extremely low latency content delivery to that particular network area. In some such embodiments, MEC controller 110 may select the optimal MEC device based on the highest probability when the highest probability also satisfies a threshold. In some embodiments, MEC controller 110 may select one or more optimal MECs device based on a set of the highest probabilities of the UE operating from a set of network areas, and the one or more optimal MEC devices providing extremely low latency content delivery to the set of network areas. In some embodiments, MEC controller 110 may select one or more optimal MEC devices based on the probability of the UE operating from any one or more network area being greater than a threshold amount, and the one or more optimal MEC devices providing extremely low latency content delivery to those one or more network areas. For instance, MEC controller 110 may determine that the UE is likely to be at a particular location at some time in the future with a 90% probability. Assuming that an example location prediction threshold is 80%, the 90% probability this 80% location prediction threshold. In this case, MEC controller 110 may determine that the particular location is within a particular network area, and may issue a prefetch message to a particular MEC device that optimally serves that particular network area and/or is located the fewest network hops from the particular network area. In some such embodiments, MEC controller may limit the predictive content replication to a maximum number of MEC devices.

Process 500 may include issuing (at 590) a prefetch message to the optimal MEC device for content that the UE is predicted to access. The predicted content may be selected based on the determined probabilities that the UE will access different content at different times. In response to prefetch message, the optimal MEC device may prefetch and cache the predicted content. As noted above, MEC controller 110 may be configured with a set of available MEC devices, the location of each MEC device, performance parameters of each MEC device to one or more network areas, addressing for communicating with each MEC device, and/or access privileges that permit MEC controller 110 to control operation of the MEC devices.

Figure 7:
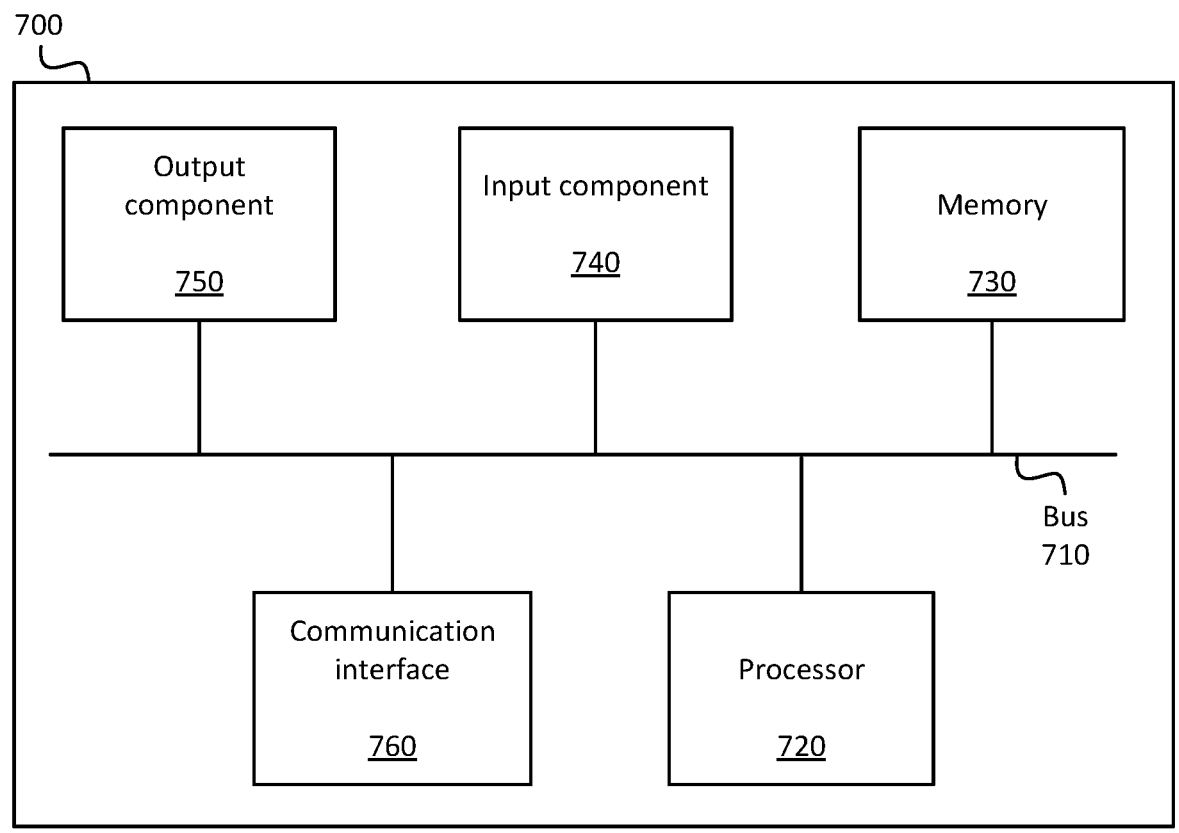
FIG. 7 illustrates example components of one or more devices, according to one or more embodiments described herein.

FIG. 7 is a diagram of example components of device 700. Device 700 may be used to implement one or more of the devices or systems described above (e.g., MEC controller 110, MEC device 140, UE 130, etc.). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For instance, the devices may be arranged according to different peer-to-peer, private, permissioned, and/or other blockchain networks.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to FIGS. 1-5, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. For instance, MEC controller 110 may execute from a shared device that also performs various services and/or functionalities for a service provider. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device comprising:
   a non-transitory computer-readable medium storing a set of processor-executable instructions; and
   one or more processors configured to execute the set of processor-executable instructions, wherein executing the set of processor-executable instructions causes the one or more processors to:
   monitor movements of a particular user equipment ("UE") across a wireless data network;
   compute, based on the monitored movements, a probability of the particular UE being moved, at a future time, from a first area, within a geographical region associated with the wireless data network, to a second area within the geographical region associated with the wireless data network, the second area being geographically distinct from the first area;
   monitor performance characteristics of a plurality of Multi-access Edge Computing ("MEC") devices that are geographically distributed within the geographical region associated with the wireless data network and that provide services to UEs located in the second area, wherein monitoring the performance characteristics includes:
   determining a first set of performance characteristics associated with services provided by a first MEC device, of the plurality of MEC devices, to UEs located within the second area, and
   determining a second set of performance characteristics associated with services provided by a second MEC device, of the plurality of MEC devices, to UEs located within the second area;
   select, based on the computed probability, and further based on the monitored performance characteristics, the first MEC device, out of the plurality of MEC devices;
   determine content that the particular UE is likely to request at the future time; and output a prefetch request, identifying the determined content, to the selected first MEC device, wherein the selected first MEC device obtains and caches the identified content based on receiving the prefetch request, wherein the first MEC device further intercepts a request for the identified content from the UE and provides the identified content to the UE based on the request.

2. The device of claim 1, wherein the probability is a first probability, wherein the processor-executable instructions further include processor-executable instructions to:
  obtain previous request patterns of the particular UE; and
  compute a second probability of the particular UE requesting first content at the future time based on the previous request patterns, and a third probability of the particular UE requesting different second content at the future time based on the previous request patterns.

3. The device of claim 2, wherein the processor-executable instructions to output the prefetch request comprise processor-executable instructions to:
  determine that the second probability satisfies a content prediction threshold;
  output a first prefetch request for the first content in response to the second probability satisfying the content prediction threshold;
  determine that the third probability satisfies the content prediction threshold; and
  output a second prefetch request for the second content in response to the third probability satisfying the content prediction threshold.

4. The device of claim 1, wherein the processor-executable instructions further include processor-executable instructions to:
  determine, based on monitoring the performance characteristics of the plurality of MEC devices, that the first MEC device provides content to UEs in the second area with less latency than the second MEC device.

5. The device of claim 1, wherein the probability is a first probability, wherein the processor-executable instructions further include processor-executable instructions to:
  compute, based on the monitored movements, a second probability of the particular UE remaining in the first area at the future time; and
  output a prefetch request for the determined content to a third MEC device of the plurality of MEC devices in response to the second probability exceeding a particular threshold probability, wherein the third MEC device provides content to UEs in the first area with less latency than other MEC devices of the plurality of MEC devices.

6. The device of claim 1, wherein the processor-executable instructions further include processor-executable instructions to:
  determine, based on the monitored movements, an intended destination of the particular UE from a plurality of destinations in the second area; and
  select the determined content from a plurality of content according to relevance of the determined content to the intended destination.

7. The device of claim 1, wherein the processor-executable instructions further include processor-executable instructions to:
  determine, based on the monitored movements, an intended destination of the particular UE from a plurality of destinations in the second area;
  obtain a list of content previously accessed by the particular UE at different locations; and
  select the determined content from a plurality of content based on the particular UE previously accessing the determined content at a location that is en route to or at the intended destination.

8. The device of claim 1, wherein the processor-executable instructions further include processor-executable instructions to:
  monitor a first segment of a media stream that is requested by the particular UE while the particular UE is in the first area and outside the second area;
  select a second segment of the media stream as the determined content that the particular UE is likely to request at the future time based on the monitoring; and
  generate the prefetch request with an identifier that is used to request the second segment from a remote content source.

9. The device of claim 1, wherein the probability is a first probability, wherein the determined content is first content, wherein the processor-executable instructions further include processor-executable instructions to:
  compute, based on the monitored movements, a second probability of the particular UE remaining in the second area at a subsequent time after the future time, and a third probability of the particular UE being moved to the first area at the subsequent time;
  determine different second content that the particular UE is likely to request at the subsequent time;
  output a first prefetch request for the second content to the first MEC device in response to the second probability satisfying a first threshold probability; and
  output a second prefetch request for the second content to the second MEC device in response to the third probability satisfying a second threshold probability.

10. A non-transitory computer-readable medium, storing a set of processor-executable instructions, which, when executed by one or more processors, cause the one or more processors to:
  monitor movements of a particular user equipment ("UE") across a wireless data network;
  compute, based on the monitored movements, a probability of the particular UE being moved, at a future time, from a first area, within a geographical region associated with the wireless data network, to a second area within the geographical region associated with the wireless data network, the second area being geographically distinct from the first area;
  monitor performance characteristics of a plurality of Multi-access Edge Computing ("MEC") devices that are geographically distributed within the geographical region associated with the wireless data network and that provide services to UEs located in the second area, wherein monitoring the performance characteristics includes:
    determining a first set of performance characteristics associated with services provided by a first MEC device, of the plurality of MEC devices, to UEs located within the second area, and
    determining a second set of performance characteristics associated with services provided by a second MEC device, of the plurality of MEC devices, to UEs located within the second area;
  select, based on the computed probability, and further based on the monitored performance characteristics, a particular MEC device, out of the plurality of MEC devices;
  determine content that the particular UE is likely to request at the future time; and output a prefetch request, identifying the determined content, to the selected first MEC device, wherein the selected first MEC device obtains and caches the identified content based on receiving the prefetch request, wherein the first MEC device further intercepts a request for the identified content from the UE and provides the identified content to the UE based on the request.

11. The non-transitory computer-readable medium of claim 10, wherein the probability is a first probability, wherein the processor-executable instructions further include processor-executable instructions to:
obtain previous request patterns of the particular UE; and
compute a second probability of the particular UE requesting first content at the future time based on the previous request patterns, and a third probability of the particular UE requesting different second content at the future time based on the previous request patterns.

12. The non-transitory computer-readable medium of claim 11, wherein the processor-executable instructions to output the prefetch request comprise processor-executable instructions to:
determine that the second probability satisfies a content prediction threshold;
output a first prefetch request for the first content in response to the second probability satisfying the content prediction threshold;
determine that the third probability satisfies the content prediction threshold; and
output a second prefetch request for the second content in response to the third probability satisfying the content prediction threshold.

13. The non-transitory computer-readable medium of claim 10, wherein the processor-executable instructions further include processor-executable instructions to:
determine, based on monitoring the performance characteristics of the plurality of MEC devices, that the first MEC device provides content to UEs in the second area with less latency than the second MEC device.

14. The non-transitory computer-readable medium of claim 10, wherein the probability is a first probability, wherein the processor-executable instructions further include processor-executable instructions to:
compute, based on the monitored movements, a second probability of the particular UE remaining in the first area at the future time; and
output a prefetch request for the determined content to a third MEC device of the plurality of MEC devices in response to the second probability exceeding a particular threshold probability, wherein the third MEC device provides content to UEs in the first area with less latency than other MEC devices of the plurality of MEC devices.

15. The non-transitory computer-readable medium of claim 10, wherein the processor-executable instructions further include processor-executable instructions to:
determine, based on the monitored movements, an intended destination of the particular UE from a plurality of destinations in the second area; and
select the determined content from a plurality of content according to relevance of the determined content to the intended destination.

16. A method comprising:
monitoring movements of a particular user equipment ("UE") across a wireless data network;
computing, based on the monitored movements, a probability of the particular UE being moved, at a future time, from a first area, within a geographical region associated with the wireless data network, to a second area within the geographical region associated with the wireless data network, the second area being geographically distinct from the first area;
monitoring performance characteristics of a plurality of Multi-access Edge Computing ("MEC") devices that are geographically distributed within the geographical region associated with the wireless data network and that provide services to UEs located in the second area, wherein monitoring the performance characteristics includes:
determining a first set of performance characteristics associated with services provided by a first MEC device, of the plurality of MEC devices, to UEs located within the second area, and
determining a second set of performance characteristics associated with services provided by a second MEC device, of the plurality of MEC devices, to UEs located within the second area;
selecting, based on the computed probability, and further based on the monitored performance characteristics, a particular MEC device, out of the plurality of MEC devices;
determining content that the particular UE is likely to request at the future time; and
outputting a prefetch request, identifying the determined content, to the selected first MEC device, wherein the selected first MEC device obtains and caches the identified content based on receiving the prefetch request, wherein the first MEC device further intercepts a request for the identified content from the UE and provides the identified content to the UE based on the request.

17. The method of claim 16, further comprising:
determining, based on the monitored movements, an intended destination of the particular UE from a plurality of destinations in the second area; and
selecting the determined content from a plurality of content according to relevance of the determined content to the intended destination.

18. The method of claim 16, further comprising:
determining, based on the monitored movements, an intended destination of the particular UE from a plurality of destinations in the second area;
obtaining a list of content previously accessed by the particular UE at different locations; and
selecting the determined content from a plurality of content based on the particular UE previously accessing the determined content at a location that is en route to or at the intended destination.

19. The method of claim 16, further comprising:
monitoring a first segment of a media stream that is requested by the particular UE while the particular UE is in the first area and outside the second area;
selecting a second segment of the media stream as the determined content that the particular UE is likely to request at the future time based on the monitoring; and
generating the prefetch request with an identifier that is used to request the second segment from a remote content source.

20. The method of claim 16, wherein the probability is a first probability, wherein the determined content is first content, the method further comprising:
computing, based on the monitored movements, a second probability of the particular UE remaining in the second area at a subsequent time after the future time, and a third probability of the particular UE being moved to the first area at the subsequent time;

determining different second content that the particular UE is likely to request at the subsequent time;

outputting a first prefetch request for the second content to the first MEC device in response to the second probability satisfying a first threshold probability; and outputting a second prefetch request for the second content to a different second MEC device in response to the third probability satisfying a second threshold probability.

\* \* \* \* \*